Nov. 17, 1931.  J. ZALLIO  1,832,605

DISPLAY DEVICE

Filed May 23, 1930

Inventor,
John Zallio
By Robert F. Miehle,
Atty

Patented Nov. 17, 1931

1,832,605

UNITED STATES PATENT OFFICE

JOHN ZALLIO, OF CHICAGO, ILLINOIS

DISPLAY DEVICE

Application filed May 23, 1930. Serial No. 454,883.

My invention relates to a display device involving relatively rotatable parts and has particular relation to automobile hub caps although not limited to this use alone.

The invention has for its main object the provision of a display device wherein a display part of the device is maintained from rotating with a rotating part with which it is associated with a view toward the maintenance of the display part in a desired position irrespective of rotation of the rotating part.

With this object in view my invention consists in certain features of novelty in the construction, combination, and arrangement of parts by which the said object and certain other objects, hereinafter appearing, are effected, all as fully described with reference to the accompanying drawings and more particularly pointed out in the appended claim.

In the said drawings—

Figure 1:
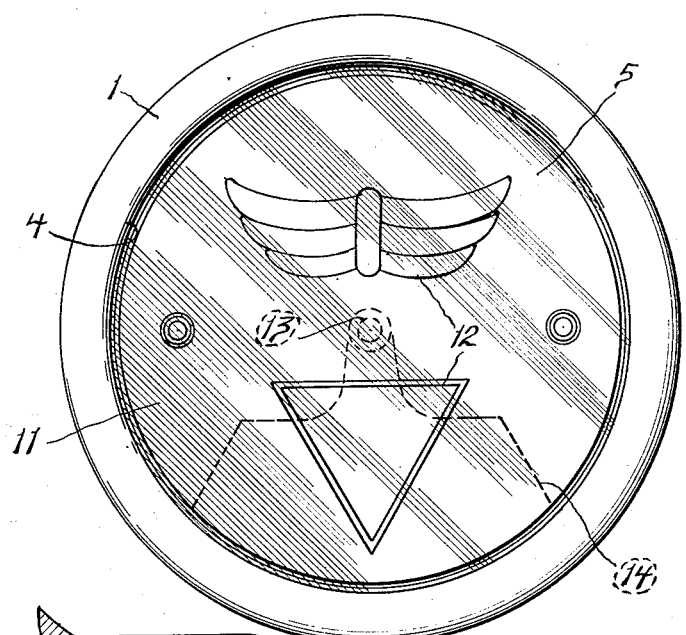
Figure 2:
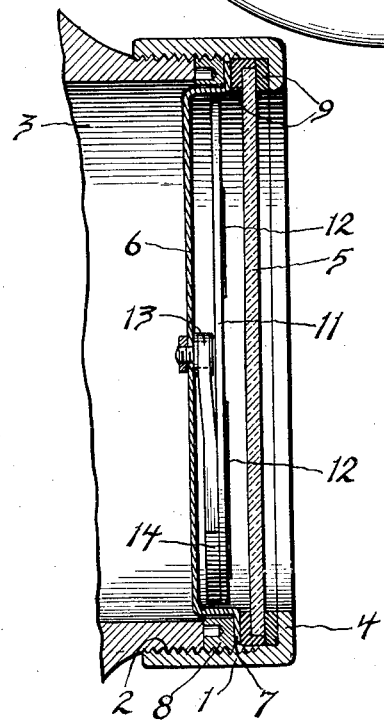

Figure 1 is a front elevation of the display device of my invention as incorporated in an automobile hub cap; and Figure 2 is a partial axial section of an automobile wheel hub with a hub cap illustrated in Figure 1 applied thereto.

Like characters of reference indicate like parts in the several views.

Referring to the drawings, 1 designates a hub cap ring which is internally screwthreaded, as designated at 2, for the mounting of the same on a conventional externally screwthreaded automobile wheel hub 3. See Figure 2.

The hub cap ring 1 is provided with an internal circular flange 4 at its outer end, thus forming an inwardly facing shoulder. Disposed in the cap ring inwardly of the flange 4 is a suitable transparency 5, of suitable material such as non-shatterable glass, which closes the axial opening of the cap ring.

A plate 6 is disposed inwardly adjacent the transparency 5 and is provided with an outwardly offset marginal flange 7 to properly space the main portion of the plate from the transparency.

An externally screwthreaded ring 8 is screwthreaded into the cap ring 1 and clamps the transparency 5 and the flange 7 of the plate 6 between it and the flange 4 of the cap ring, suitable gaskets 9 being interposed between the transparency and the cap ring and the transparency and the plate.

Thus the transparency 5 and the plate 6 are mounted on the cap ring 1, the hub cap comprising the cap ring and transparency being removable from the hub 3 as a unit.

Disposed between the transparency 5 and the plate 6 is a display disk 11, the outer face of which, with display matter or insignia 12 thereon, is visible through the transparency. See Figures 1 and 2.

The display disk 11 is mounted on the plate 6 by means of a suitable centrally disposed bearing 13 whereby the plate 6 transparency 5 and cap ring 1 are rotatable with reference thereto.

Mounted on the back of the display disk 11 is a weight 14 which maintains the display disk from rotation with the hub and hub cap, thus maintaining the display disk with the display matter or insignia 12 thereon in a proper or upright position irrespective of rotation of the hub and hub cap.

It will be observed that the space between the transparency 5 and the plate 6, the display disk 11 being disposed therein, is sealed both externally and internally of the hub and hub cap with obvious advantage.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

In a cap construction the combination of an internally screwthreaded cap ring provided with an internal circular flange, a transparency in said ring inwardly of said flange and closing the axial opening of said ring, a plate disposed inwardly adjacent said transparency, an externally screwthreaded ring screwthreaded into said cap ring and clamping said transparency and said plate between it and said flange, a display disk disposed between said plate and transparency and visible through said transparency, a bearing whereby said display disk is carried by said plate to permit rotation of said cap ring with reference to said display disk, and weight means on said display disk and maintaining the same from rotation with said cap ring.

In witness whereof I hereunto affix my signature this 12th day of May, 1930.

JOHN ZALLIO.